United States Patent [19]

Christian

[11] Patent Number: 4,832,360
[45] Date of Patent: May 23, 1989

[54] GREASEBALL HITCH

[76] Inventor: Douglas R. Christian, 840 S. Main St., Cedar City, Utah 84720

[21] Appl. No.: 169,433

[22] Filed: Mar. 17, 1988

[51] Int. Cl.$^4$ .............................................. B60D 1/06
[52] U.S. Cl. ................................................. 280/511
[58] Field of Search .............................. 280/504, 511

[56] References Cited

U.S. PATENT DOCUMENTS

| | | | |
|---|---|---|---|
| 2,558,906 | 7/1951 | Leon | 280/511 |
| 2,567,530 | 9/1951 | Schule | 280/511 |
| 3,436,101 | 4/1969 | Hanson | 280/511 |
| 4,283,072 | 8/1981 | Deloach, Jr. | 280/511 |
| 4,444,410 | 4/1984 | Martin | 280/511 |

*Primary Examiner*—Charles A. Marmor
*Assistant Examiner*—Ross Weaver

[57] ABSTRACT

The purpose of this invention is to allow the lubrication of a ball and coupler while being attached together. Unity of a ball and coupler are essential to this invention. The size of ball is immaterial to the function of the design. Lubrication is accomplished through a system comprising of internal ports and external exiting port holes. An internal port system that comprising a variety of ports and exiting port holes to the surface of the ball at various angles allowing lubrication between the ball and socket of the coupler. An external lubrication fitting is attached to the internal lubrication port system. Pressurization occurs when an external lubrication is introduced into the internal porting system through the external lubrication fitting. The amount of lubrication to the ball and socket is controlled by the amount of lubrication introduced into the internal porting system via the lubrication fitting.

11 Claims, 1 Drawing Sheet

GREASEBALL HITCH

BACKGROUND OF THE INVENTION

1. Field of the Invention

The present invention relates to the industries that use the ball hitch device as a towing mechanism, more particularly, the lubrication of said ball hitch device without uncoupling the ball from the hitch.

2. Description of the Prior Art

The concept of lubricating the socket between a ball and hitch or coupler has been addressed previously; however, of the references cited, this invention creates a system more advanced and desirable than the others. Following are three references that are similar:

| U.S. Pat. No. | Issue Date | Patentee |
| --- | --- | --- |
| 2,567,530 | Sept. 11, 1951 | E. A. Shule |
| 2,558,906 | July 3, 1951 | P. R. Leon |
| 3,436,101 | April 1, 1969 | R. R. Hansen |

SUMMARY OF THE INVENTION

This is an invention of a ball that can be easily greased while being attached to a coupler. In today's world the ease of use determines success or failure, it is for this reason the GREASEBALL (TM) Hitch will be a success. There are four basic industries that use the ball coupler in great measure: RV, Agriculture, Construction, and transportation.

These industries require a product that is easily used. The GREASEBALL (TM) can receive its lubrication without being uncoupled. This feature far surpasses any design that has preceded it.

In the following documentation of this invention it will become evident that there are many positive points that are accomplished.

Cost effectiveness is of importance in the production of this invention. Castings of trailer balls are already available for use. Any tooling necessary for the boring of the internal port system will be minimal making the production cost efficient.

DESCRIPTION OF THE PREFERRED EMBODIMENT

Figures 1, 2:
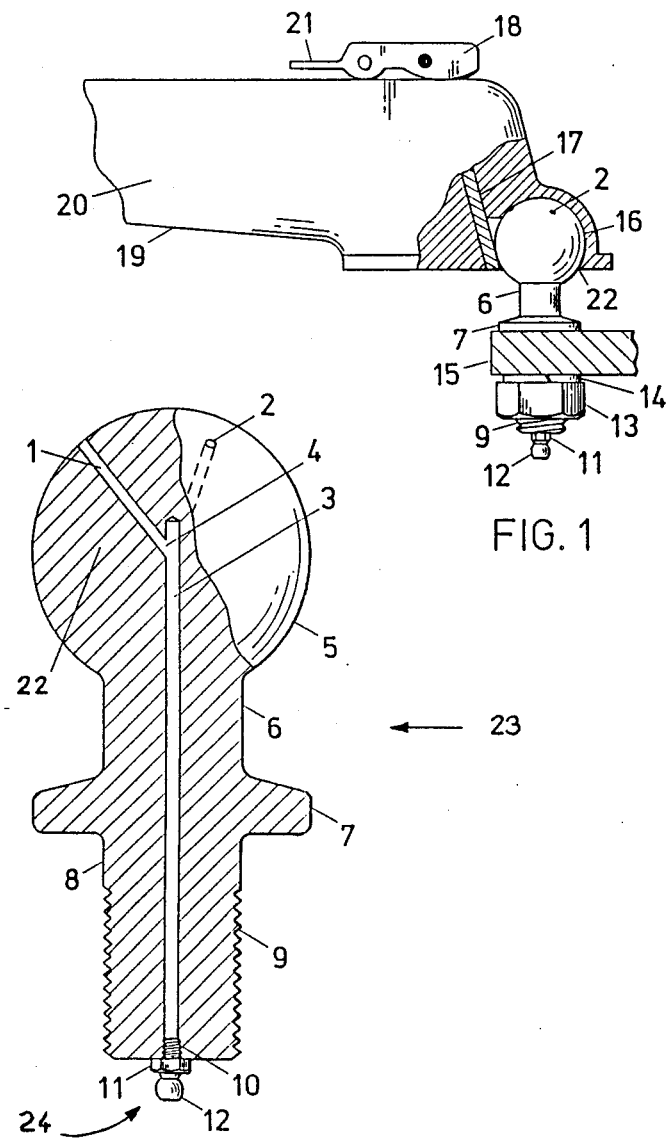
FIG. 1 is a cut away illustration of the GREASEBALL TM hitch with the coupler attached in the towing position, and shows the coupler socket, the friction point of attachment and exiting lubrication ports.
FIG. 2 is a sectional view of the GREASEBALL TM hitch, showing the internal pressurized port system and grease fitting.

As shown in FIGS. 1 and 2, Internal port 1 extends from the bottom of the stem 6 up through the ball 22 itself. This port is small in diameter as to create an internal pressurized system inside the ball-and-stem unit 23. The diameter of this port 1 may be adjusted larger to allow the flow of internal fluid (grease as a lubrication) to be easier in colder climates, or smaller to constrict the flow of internal fluid in hotter climates.

A canted exiting port 2 hole of the internal porting system is shown. The number of exterior ports or their position around the ball 22 is relative to the portion of the ball receiving the most friction during the towing process. The position recommended is the exiting port or ports 2 be directed toward the towing vehicle. Turning by the towing vehicle will allow the lubricating fluid to spread around the entire surface of the ball 22, as well as the coupler 20 to which it is connected, thus reducing the wearing of the two metals.

Vertical internal pressurized port 3 contains a lubricant to the canted exiting port hole 2, allowing the lubrication of both the ball 22 and the socket 16 of the coupler 20. The small diameter of the vertical port 3 will not significantly reduce the shear strength of the stem 6 of the ball-and-stem unit 23 used; however, if an extremely small stem is used then the vertical port diameter must be reduced. The recommended size of the internal porting system 1, 3 for an all weather use would be no larger than ⅛" in diameter with a ball stem size of " or larger.

Internal port junction 4 of vertical port 3 and canted exiting ports 1 is shown near the center of ball 22. The number of ports 1 at this junction 4 is relative to the number of exiting ports 1 desired.

Continual spherical ball 22 has outer surface 5.

Neck or stem 6 is a projection of spherical ball 22. The size of this stem may vary upon the use of the GREASEBALL TM hitch. Standard sizes are as follows: ¾", 1", ¼". Larger or smaller stems may be adapted too.

Step 6 includes an enlarged flange 7 to allow the ball-and-stem unit 23 to rest on and be connected to any surface for mounting purposes. This flange 7 allows a locking ring or washer 14 and a nut 13 or bolt to be used in the attaching or mounting process. The thickness of this flange 7 should be sufficiently for the bearing weight of the item being towed.

Stem body 8 protrudes through an aperture for mounting of the ball-and-stem unit, and has a threaded shank or stem portion 9 for the purpose of attaching with a locking ring 14 and a nut 13 assembly. The threaded shank 9 is an extension of the ball-and-stem unit.

Threaded or pressure fitting 10 attaches to a grease fitting 24 for the attachment onto the bottom of the stem 6, into the vertical port 3, as part of the system to insert the lubricant into the pressurized porting system.

Flange 11 of the grease fitting 24 allows attachment to the bottom of the threaded shank 8.

Grease fitting inlet 12 is for the purpose of introducing lubricant into the internal pressurized porting system 1, 3.

Nut 13 is used for attaching the ball-and-stem unit 23 through an aperture in flange 15 for the purpose of mounting thereto.

Lock ring 14 is used for attaching the ball-and-stem unit 23 through an aperture in flange 15 for the purpose of mounting thereto.

Shown is protruding flange 15 with aperture through which the stem or shank 8 of the ball-and-stem unit 23 is secured for mounting and towing purposes. The strength of this flange 15 is sufficient for the stress that may be required at any direction. This connection is a common point of reference in the towing industry.

The socket 16 of the coupling device 20 is for the purpose of attaching with the ball 22 creating a positive towing feature. The socket 16 becomes dry through the towing process allowing the metal surface 5 of the ball 22 and the metal of the socket 16 to wear against each other. If a lubricant is not used in this joint there will be excessive metal wear creating an enlarged socket 16 cavity or and oblong ball, requiring replacement of either the ball 22 or the coupler 20 or both prematurely.

The Locking feature 17 of the coupling device 20 varies with each manufacturer of couplers. The grease from the GREASEBALL TM hitch will also aid in the lubrication of this locking device 17.

The locking device 17 for the coupler 20 includes lever 18. This locking lever also varies with styles used by manufacturers. This is an important feature that secures the ball 22 and coupler 20 to create a safe towing atmosphere. In the late 1940's and early 1950's the locking feature of the coupler was an apparent problem; as a result there are many different styles of coupler locking devices to not allow the un-coupling of the towing vehicle and the towed item. Two of these devices are mentioned in the references cited at the beginning of this document.

Receiving sleeve 19 is attached to the frame of the item being towed. This sleeve 19 may be attached through the welding process or by the use of bolting. If bolts are used, they should be of hardened steel for shear strength.

Coupler body 20 is attached to the frame of the towed item through the welding process or through bolting.

Finger pull 21 on this design of a coupler locking device 17 is used to aid the ease of locking the coupler 20 to the ball.

Having explained my invention I claim the following:
1. A lubricated ball hitch, comprising:
   a ball-and-stem unit comprising:
      a ball with a spherical surface;
      an integral stem extending downward from said ball, having a threaded lower end and an enlarged flange between said ball and said threaded lower end, said threaded lower end and said enlarged flange adapted for attachment to a towing vehicle;
      an internal pressurized port system comprising a vertical internal port extending from said lower end of said stem into said ball, and one or more exiting ports extending from said ball to said spherical surface of said ball;
      a grease fitting attached to said lower end of said stem and connecting with said vertical internal port for the pressurized port system; and
   a coupler adapted for attachment to a trailer for towing thereof, and having a socket adapted for lockable placement upon said ball for connecting said trailer to said towing vehicle.
2. The lubricated ball hitch according to claim 1 wherein one to four canted exiting ports extend from said junction with said vertical internal port to said spherical surface of said ball.
3. The lubricated ball hitch according to claim 2 wherein one or two of said canted exiting ports extend upward and toward the towing vehicle from said junction.
4. The lubricated ball hitch according to claim 2 wherein:
   at least one of said canted exiting ports extends upward and toward the towing vehicle from said junction, and at least one other of said canted exiting ports extends upward and away from said towing vehicle.
5. The lubricated ball hitch according to claim 1, wherein:
   said vertical internal port and said exiting ports have an internal diameter of no more than ⅛ inch.
6. A ball-and-stem unit for a hitch, comprising:
   a ball with a spherical surface adapted for lockable enclosure by a coupling socket;
   an integral stem extending downward from said ball, having a threaded lower end and an enlarged flange adapted for attachment to a towing vehicle;
   an internal pressurized port system comprising a vertical internal port extending from said lower end of said stem into said ball, and one or more exiting ports extending from a junction with said vertical internal port in said ball to said spherical surface of said ball; and
   a grease fitting attached to said lower end of said stem and connecting with said vertical internal port for pressurized injection of lubricant into said internal pressurized port system.
7. The lubricated ball-and-stem unit according to claim 6, wherein:
   said threaded lower end of said integral stem is adapted to pass through a flange attached to said towing vehicle, and be secured by a lock ring and nut screwed thereon.
8. The lubricated ball-and-stem unit according to claim 6, wherein:
   one or four canted exiting ports extend from said junction with said vertical internal port to said spherical surface of said ball.
9. The lubricated ball-and-stem unit according to claim 8, wherein:
   one or two of said canted exiting ports extend upward and toward the towing vehicle from said junction.
10. The lubricated ball-and-stem unit according to claim 8, wherein:
    at least one of said canted exiting ports extends upward and toward the towing vehicle from said junction, and at least one other of said canted exiting ports extends upward and away from said towing vehicle.
11. The lubricated ball-and-stem unit according to claim 6, wherein:
    said vertical internal port and said exiting ports have an internal diameter of no more than ⅛ inch.

* * * * *